United States Patent [19]

Johnson

[11] 4,317,198

[45] Feb. 23, 1982

[54] RATE CONVERTING BIT STREAM DEMULTIPLEXER AND MULTIPLEXER

[75] Inventor: Raymond E. Johnson, Richardson, Tex.

[73] Assignee: Rockwell International Corporation, El Segundo, Calif.

[21] Appl. No.: 106,564

[22] Filed: Dec. 26, 1979

[51] Int. Cl.³ .............................................. H04J 3/02
[52] U.S. Cl. ...................................... 370/112; 370/84
[58] Field of Search .................... 370/112, 84, 91, 92

[56] References Cited

U.S. PATENT DOCUMENTS

| | | | |
|---|---|---|---|
| 3,274,340 | 9/1966 | Balderston et al. | 370/112 |
| 3,821,480 | 6/1974 | Dundon et al. | 370/112 |
| 3,912,872 | 10/1975 | Callens | 370/112 |

Primary Examiner—Douglas W. Olms

Attorney, Agent, or Firm—V. Lawrence Sewell; Howard R. Greenberg; H. Fredrick Hamann

[57] ABSTRACT

A rate converting bit stream demultiplexer and related multiplexer are disclosed. In the demultiplexer, there are two groups of N cascaded shift registers. A serial input data stream is alternately entered first into one of the groups of registers and then into the other. While the input data is being entered into one of the register groups, it is being simultaneously read from each shift register of the other group at a rate equal to the bit rate of the input data stream divided by N. In the multiplexer, the situation is reversed, with data being read from multiple input channels into each shift register in one group, while data is being read from a single output of the cascaded registers of the other group at a rate equal to N times the bit rate on the input channels.

2 Claims, 3 Drawing Figures

RATE CONVERTING BIT STREAM DEMULTIPLEXER AND MULTIPLEXER

BACKGROUND OF THE INVENTION

This invention relates to demultiplexing an input serial bit stream into several serial output bit streams. Additionally, it relates to multiplexing several bit streams into one.

When a serial stream of digital bits is demultiplexed into multiple output channels, further processing of the channels may be carried out on a separate circuit card or cards from one containing the multiplexer. This requires the transmission of the demultiplexed channel signals from card to card through back plane wiring. The present invention discloses a demultiplexing scheme and a related multiplexing scheme, which have as a feature of their operation that the data streams on the output channels operate at a fraction of the frequency of the data input stream. As a result, high frequency electrical interference given off by the back plane wiring may be decreased substantially. In addition, less demanding low speed logic may be employed in the associated processing circuitry.

SUMMARY OF THE INVENTION

In accordance with the present invention, there is provided a rate converting bit stream multiplexing having two groups of cascaded shift registers with N registers in each group. A serial input data stream is alternately entered in one of the groups of registers and then the other. While the input data is being entered in one of the register groups, it is being simultaneously read from each shift register of the other group, at a rate equal to the bit rate of the input data stream divided by N. Then data is read from each register of the first group at the slower rate, while the registers of the other group are refilled from the input data stream.

Additionally, there is provided in accordance with the invention, a multiplexer for multiplexing between input channels. It also employs alternate writing and reading into two groups of N cascaded shift registers. In this case, data is simultaneously written into each register of one group from a different one of the input channels. At the same time, an output data stream is taken from the other group at the output of the final shift register in the cascaded configuration, at a rate which is N times the rate of data entry into the individual registers.

DESCRIPTION OF A PREFERRED EMBODIMENT

Figure 1:
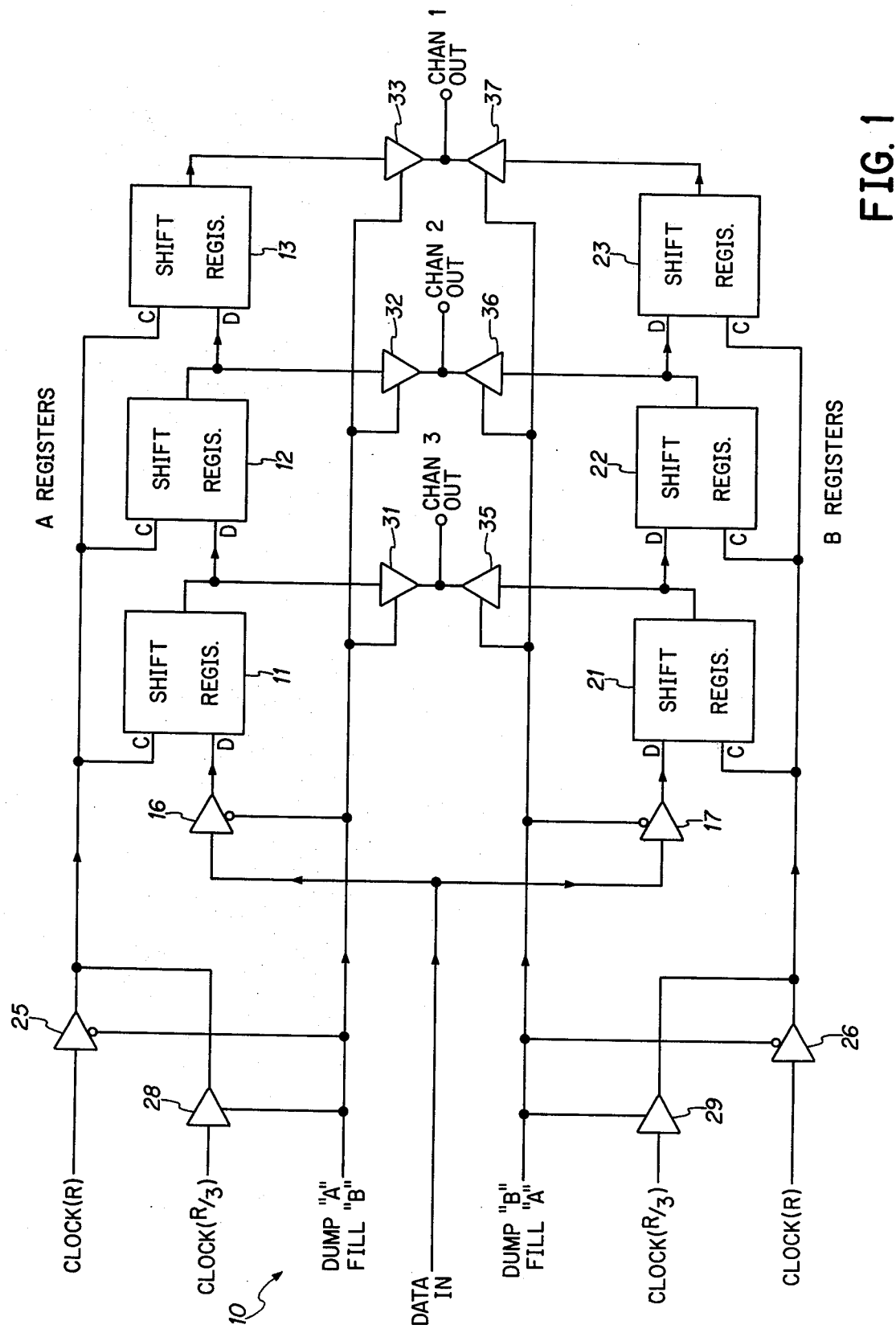
FIG. 1 is a diagram of a demultiplexer according to the invention.

FIG. 1 illustrates a demultiplexer in accordance with the invention, indicated generally by the reference numeral 10. In the example of FIG. 1, a single data stream at the DATA IN input is demultiplexed into three output channels, indicated in the Figure as CHAN1 OUT, CHAN2 OUT, and CHAN3 OUT.

Major elements in the demultiplexer are three shift registers 11-13 of Group A and three shift registers 21-23 of Group B. The registers in each group are cascaded; that is, the data output of the initial register 11 is connected to the data input of the next register an so forth. The output from the group of registers is taken from the data output of the final register in the cascade, for example, register 13. Preferably, all of the shift registers 11-13 and 21-23 have the same bit capacity, which will be designated herein as M. The effect of the cascading is conventional, namely, a data stream entered at the data input of register 11 will shift through all of the registers and be in that bit position ready to be output from shift register 13, when a total of 3 M bits have been entered into the input of register 11.

Typically, bits of data received by the demultiplexer will be grouped in frames one after another, identified by framing bits. For many applications, the number of bits within each of the shift register groups (3 M in the example) will be suitably set equal to the frame length, that is, the number of data bits in one frame. In general, for convenience, the frame length will be some integral multiple of M, the shift register capacity.

Figure 2:
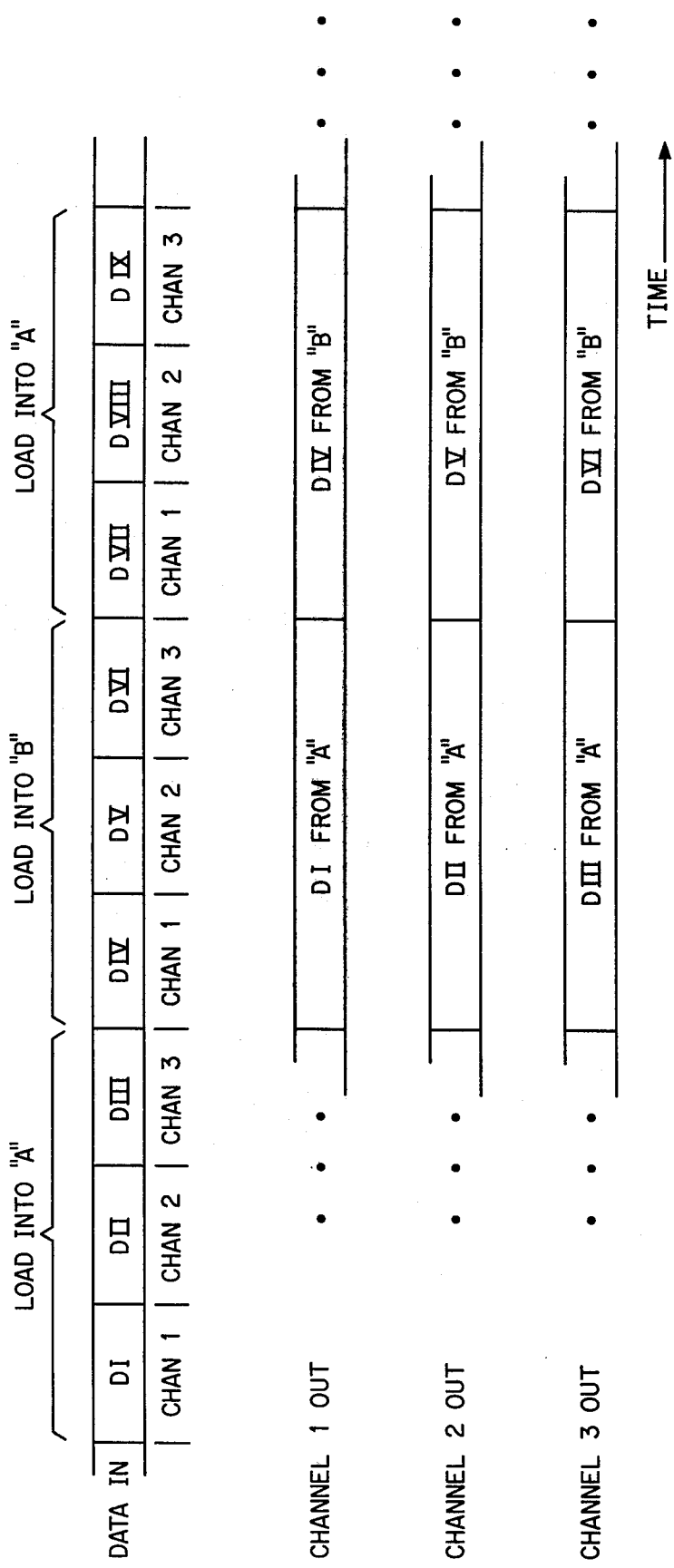
FIG. 2 is a timing diagram illustrating the demultiplexing of data by the device of FIG. 1.

The structure and operation of the demultiplexer 10 will be described additionally with respect to representations of data inputs and outputs in FIG. 2, along with FIG. 1. The upper line of FIG. 2 is intended to represent a succession of segments of data bits, the first segment DI being associated with output channel 1, the next DII, associated with channel 3, DIII associated with channel 3, and so forth. Each of the data segments has M bits, the capacity of one of the shift registers. In the overall operation of the demultiplexer 10, a first portion of the input data stream, composed of segments, DI-DIII is loaded into the A registers, and then the next portion, composed of segments DIV-DVI, is loaded into the B registers, while segments DI-DIII are output from the A registers in a particular way.

Data is directed into the A registers when the control signal DUMP "A", FILL "B" is inactive. The data, entering the demultiplexer at the DATA IN terminal is passed by transmission gate 16 to the data input of the initial shift register 11. A clock at a frequency R is applied through transmission gate 25 to the clock inputs of the A registers 11-13, so that the data is clocked into the registers at the bit rate R.

When the A registers have been filled by clocking the 3 M bits of data, the DUMP "A", FILL "B" signal becomes active. This event cuts off the clock at bit rate R at transmission gate 25 and enables a clock at bit rate R/3 at transmission gate 28. In addition, transmission gates 31, 32, and 33 enable readout from the data output of shift registers 11, 12, and 13 respectively. As a result, the contents of shift register 13 are clocked out at a rate R/3 at the channel 1 output, while the contents of 12 and 11 are output at the same rate at the channel 2 and 3 outputs respectively.

While the A registers are being read, new data is being entered into the B registers. This happens, because as the DUMP "A" FILL "B" signal becomes active, the DUMP "A", FILL "B" signal becomes inactive. The latter event enables data into shift register 21 through transmission gate 17 and applies a clock at the rate R to the B registers.

The new data loaded into the B registers is illustrated in FIG. 2 by the segments DIV-DVI. As indicated in that Figure, these are destined for channels 1-3, respectively. As shown beneath the entry of data segments DIV-DVI in FIG. 2, channel 11 is outputting the data segment DI previously loaded into the A registers, and channels 2 and 3 are outputting data segments DII and DIII, respectively. Since the data being read from the A registers is being clocked out at ⅓ the rate of data entry, the output on channels 1–3 consumes as much time as the loading of data into the B registers.

When the B registers are fully loaded with new data, the DUMP "B", FILL "A" signal becomes active and the DUMP "A", FILL "B" signal becomes inactive. As illustrated in FIG. 2, new data segments DVII–DIX are loaded into the A registers, while the data segments DIV–DVI are read from the B registers. As before, the clock at a bit rate of R/3 is enabled, so that the data is output on channels 1–3 at a lower rate.

Figure 3:
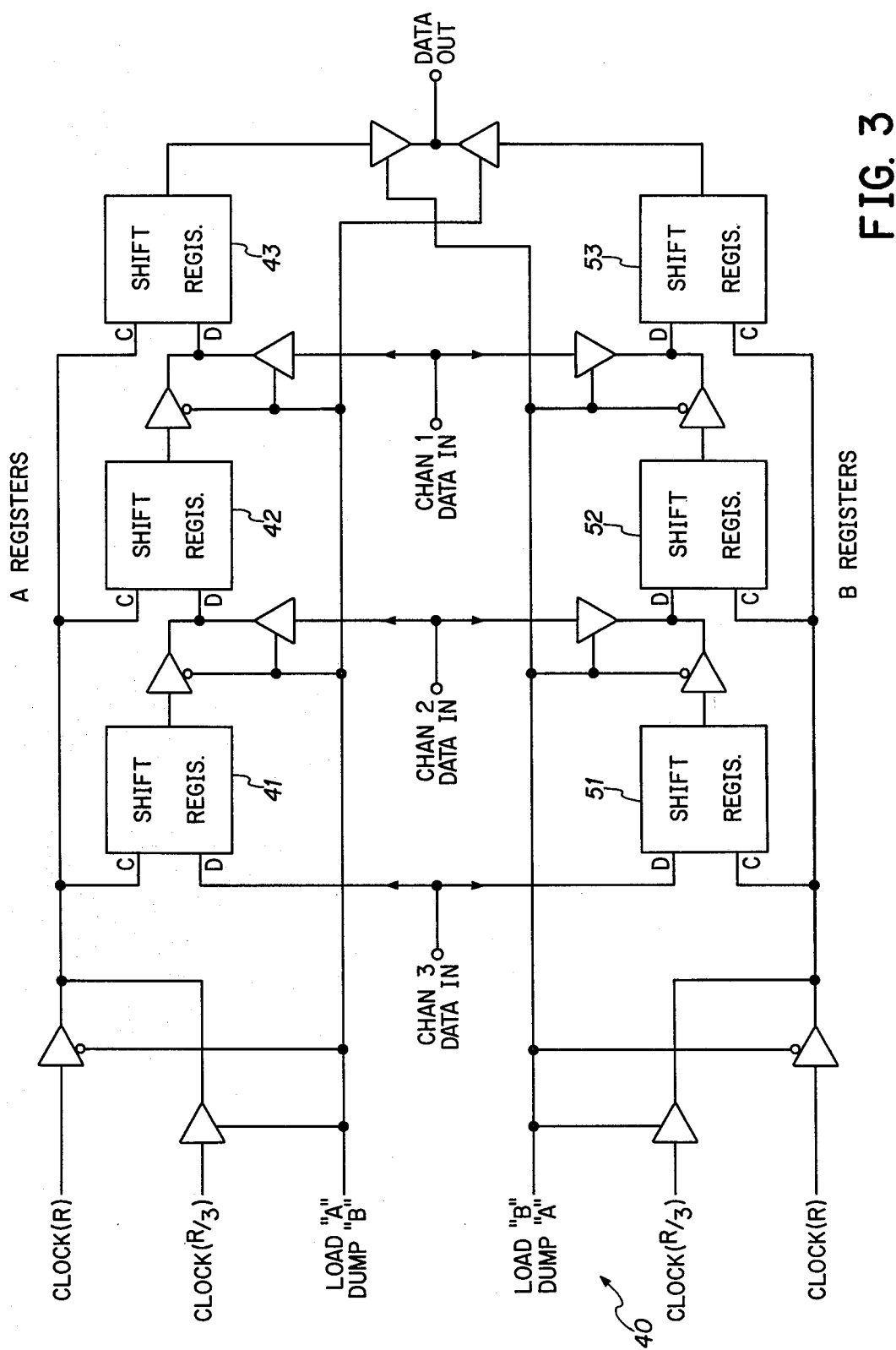
FIG. 3 is a diagram of a multiplexer according to the invention.

FIG. 3 shows a multiplexer in accordance with the invention, indicated generally by the reference numeral 40. In this case, a LOAD "A", DUMP "B" signal causes 3 M bits of data to be entered from channels 1–3 into the A shift registers 41–43 from channels 3, 2, and 1, respectively. The LOAD "A", DUMP "B" signal enables the clock at a bit rate of R/3 to clock the data into the individual registers at that rate.

When each of the registers has received M bits of data, the LOAD "A", DUMP "B" signal becomes inactive, and the LOAD "B", DUMP "A" signal becomes active. This causes the data in the A registers to be read to the DATA OUT output terminal, with the data shifting sequentially through the cascaded registers. That is, for example, the initial bit in shift register 41 shifts through both registers 42 and 43 to the output of the device 40. The clock with frequency R is enabled to read the A registers at that bit rate.

While the A registers are being read, the activation of the LOAD "B", DUMP "A" signal causes the data on channels 1–3 to be entered into shift registers 53, 52, and 51 respectively. This is carried out at a bit rate determined by the clock with rate R/3. The number of bits being entered in, say, shift register 51 is ⅓ the number of bits being shifted out of the DATA OUT terminal, but the output is going on at three times the rate of the input, so that the same amount of time is consumed by the output and input procedures.

It is an advantage of the devices according to the invention that they provide a lower bit rate operation on the back plane wiring. That is, for example, with reference to demultiplexer 10 of FIG. 1, the data stream at the DATA IN terminal can be operating at a bit rate of 1.5 mHz. With three shift registers in each group, the channels 1–3 each operate at a bit rate of 0.5 mHz. As a result, if channels 1–3 must be carried by wires to other circuit cards for additional processing, they will be significantly less prone to cause electrical noise in nearby components because of their lower frequency of operation.

I claim:

1. A bit stream demultiplexer comprising:
    a rate converting first group of N cascaded shift registers, each register having a capacity for a segment of data M bits long;
    a second group of N cascaded shift registers, each having a capacity for a segment of data M bits long;
    means for serially entering, at a bit rate R, a first bit stream portion of N of said data segments, at an input of an initial register in said first group;
    means for serially entering, at a bit rate R, a second bit stream portion of N data segments at an input of an initial register in said second group; and
    means for serially reading M bits from each shift register in said first group at a rate of R/N, the reading from each register beginning upon the initiation of said entering of the second bit stream portion in said second group.

2. Means for multiplexing between N input channels into a single output bit stream at a different rate, comprising:
    a first group of N cascaded shift registers, each register having a capacity for a segment of data M bits long;
    a second group of N cascaded shift registers, each having a capacity for a segment of data M bits long;
    means for simultaneously serially entering a data segment of M bits from each one of said input channels into a different one of said shift registers in said first group, at a bit rate of R;
    means for simultaneously serially entering a data segment of M bits from each one of said input channels into a different one of said shift registers in said second group at a bit rate of R; and
    means for reading, at a bit rate N×R, said output bit stream from a data output of a final one of the cascaded shift registers in said first group, beginning upon the initiation of said entering of the data segments into the registers of said second group.

* * * * *

UNITED STATES PATENT AND TRADEMARK OFFICE
CERTIFICATE OF CORRECTION

PATENT NO. : 4,317,198
DATED : Feb. 23, 1982
INVENTOR(S) : Raymond E. Johnson

It is certified that error appears in the above-identified patent and that said Letters Patent are hereby corrected as shown below:

col. 1, line 28 delete "multiplexing" and substitute therefor --demultiplexer--.

line 40 after "between" insert --N--.

col. 2, line 3 delete "an" and substitute therefor --and--.

line 46 delete "the" second occurrence and substitute --in--.

line 68 delete "channel 11" and substitute therefor --channel 1--.

Signed and Sealed this

Twenty-seventh Day of July 1982

[SEAL]

Attest:

Attesting Officer

GERALD J. MOSSINGHOFF

Commissioner of Patents and Trademarks